July 25, 1933.　　　C. B. THWING　　　1,920,039
TESTING MACHINE
Filed July 16, 1929　　4 Sheets-Sheet 1

Inventor:-
Charles B. Thwing
by his Attorneys
Howson & Howson

July 25, 1933.　　　C. B. THWING　　　1,920,039
TESTING MACHINE
Filed July 16, 1929　　　4 Sheets-Sheet 2

Inventor:—
Charles B. Thwing
by his Attorneys
Howson & Howson

July 25, 1933.  C. B. THWING  1,920,039
TESTING MACHINE
Filed July 16, 1929    4 Sheets-Sheet 3

Inventor:—
Charles B. Thwing
by his Attorneys
Howson & Howson

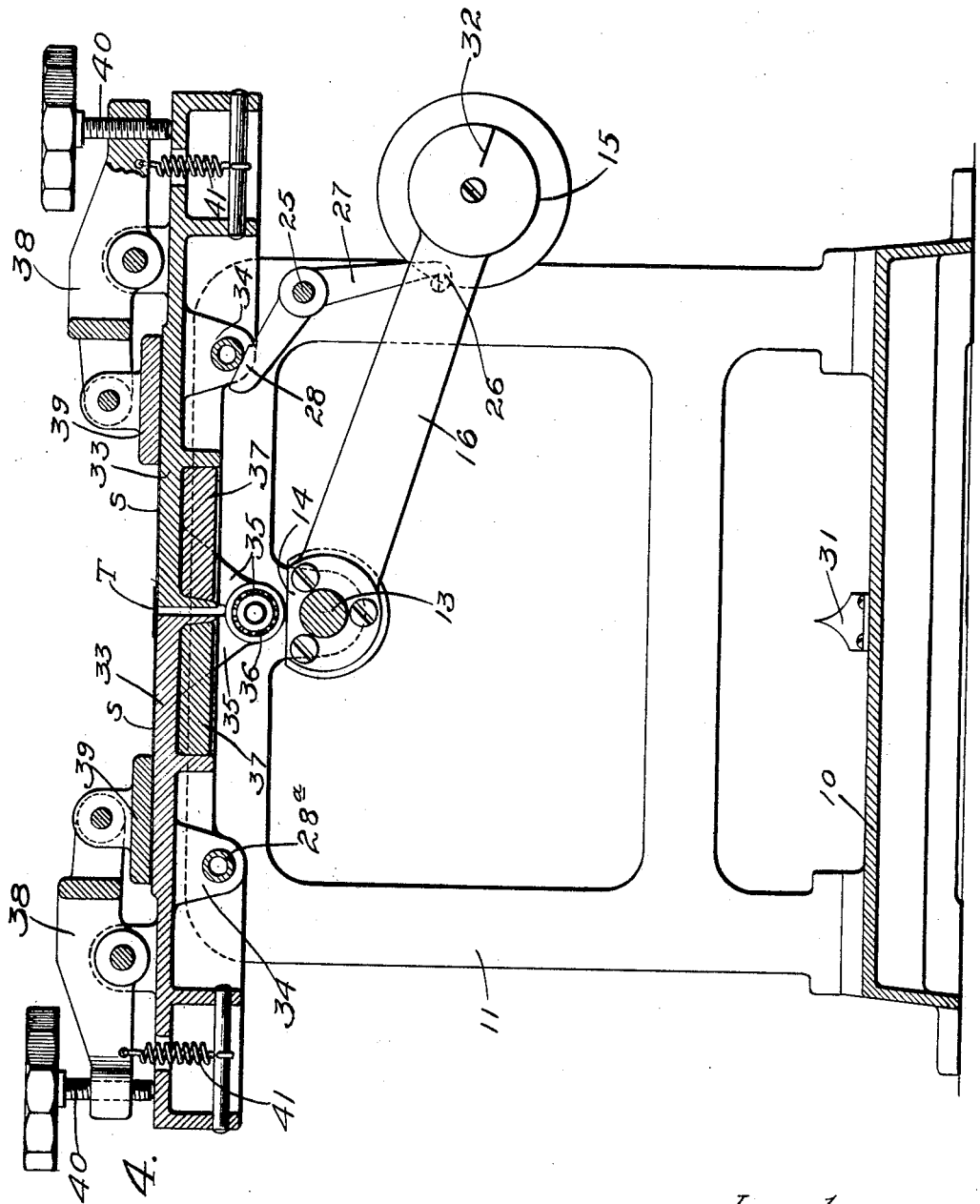

Patented July 25, 1933

1,920,039

UNITED STATES PATENT OFFICE

CHARLES B. THWING, OF PHILADELPHIA, PEPNNSYLVANIA, ASSIGNOR TO THWING INSTRUMENT COMPANY, OF PHILADELPHIA, PENNSYLVANIA, A CORPORATION OF PENNSYLVANIA

TESTING MACHINE

Application filed July 16, 1929. Serial No. 378,690.

This invention relates to testing machines and more particularly to an apparatus for testing the efficiency of gummed tape.

Gummed tapes vary considerably in their practical value due to variation in the quality of the glues employed thereon. An important feature in determining the quality of glue when employed on gummed tapes is its resistance to slippage after being moistened and applied to paper or fabric and before it is completely dried. An efficient tape should have practically instantaneous adhesion, and an important object of this invention is the production of a practically usable apparatus for testing such tapes for their adhesive strength at a definite period after moistening and application.

A further object of the invention is to provide an apparatus of this character which may be ruggedly constructed so that it is not susceptible to errors occurring through wear upon the several parts and which at the same time is sufficiently delicate that an accurate determination of the adhesive qualities of the glue employed may be secured.

A still further object of the invention is to provide an apparatus of this character in which the tests may be readily made by any person.

These and other objects I attain by the construction shown in the accompanying drawings wherein, for the purpose of illustration, I have shown a preferred embodiment of my invention and wherein:

Fig. 4 is a section on line 4—4 of Fig. 3; and

Figure 1:
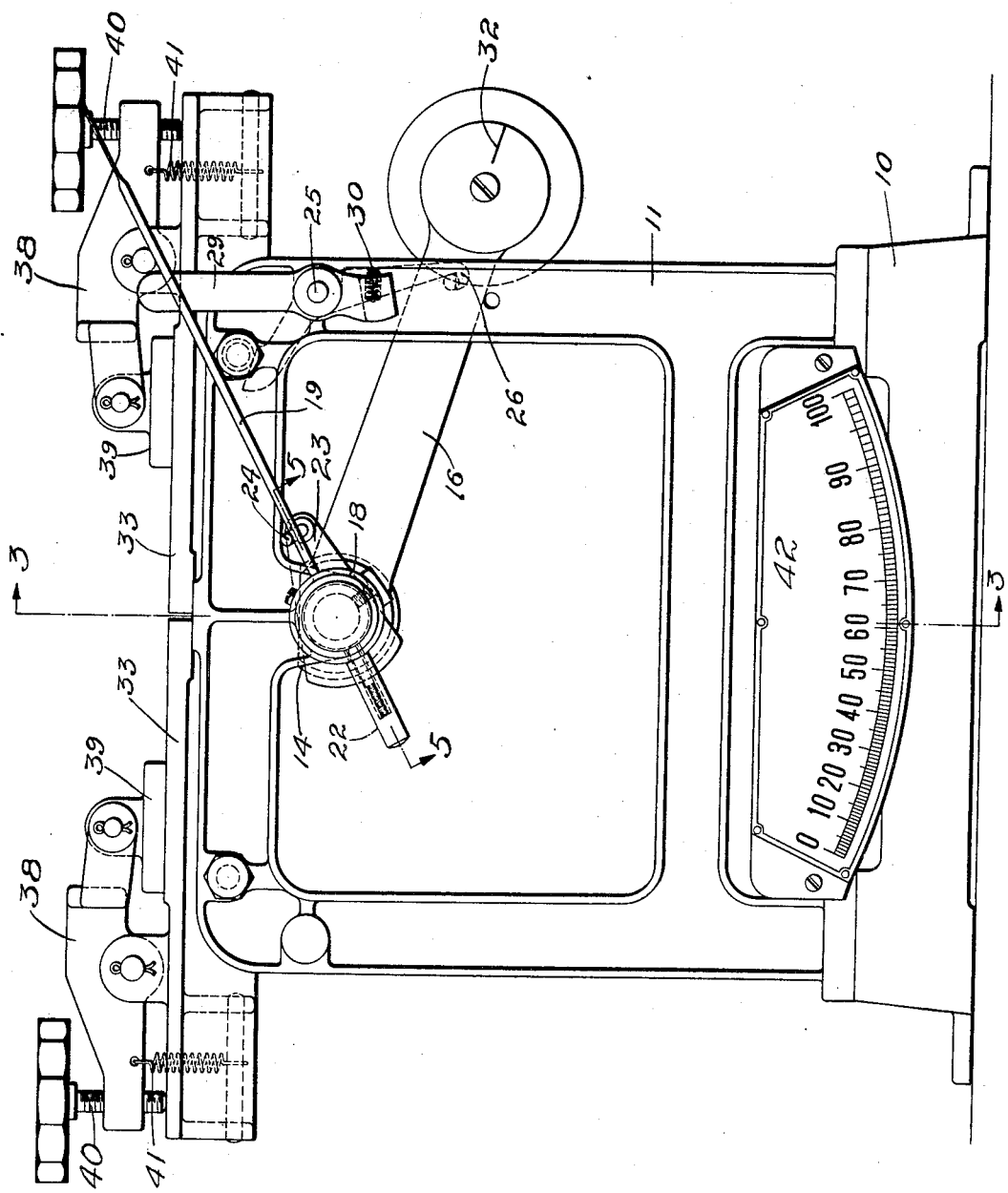
Fig. 1 is a side elevation of a testing machine constructed in accordance with my invention.
Figure 2:
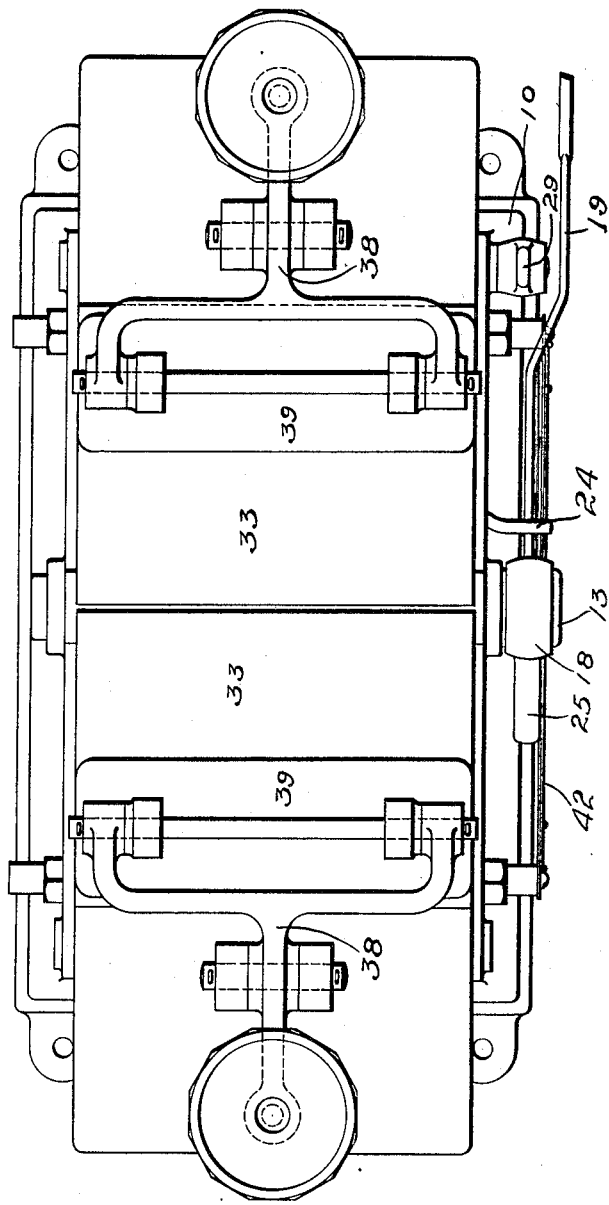
Fig. 2 is a plan view thereof.
Figure 3:
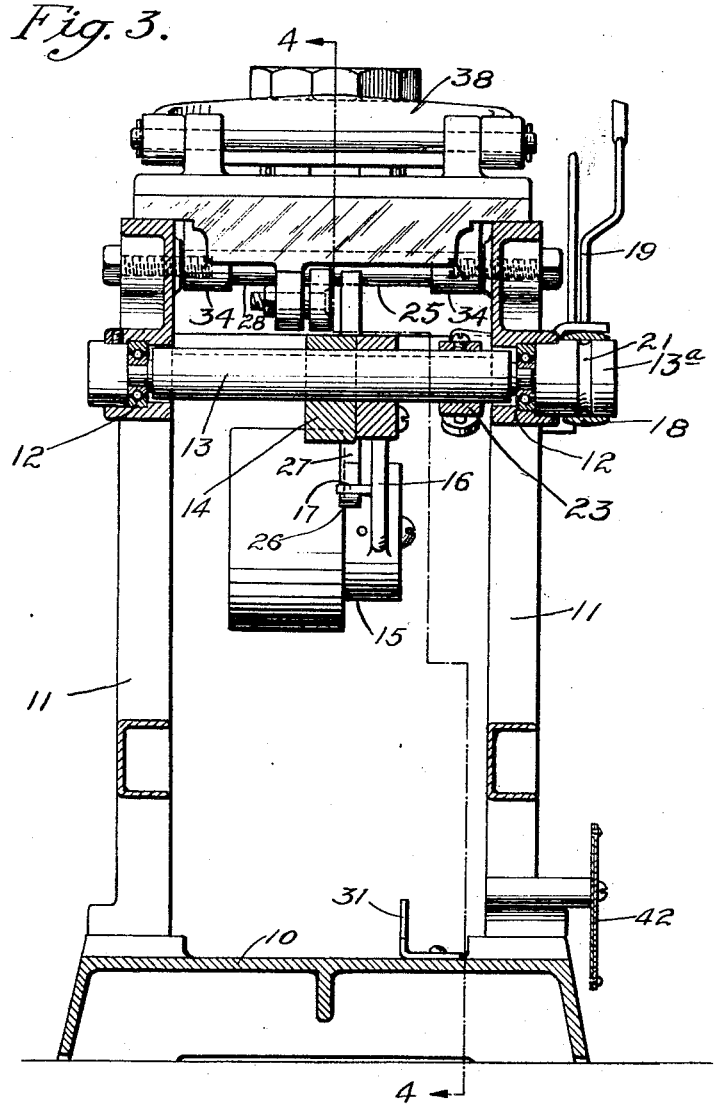
Fig. 3 is a section on line 3—3 of Fig. 1.
Figure 5:
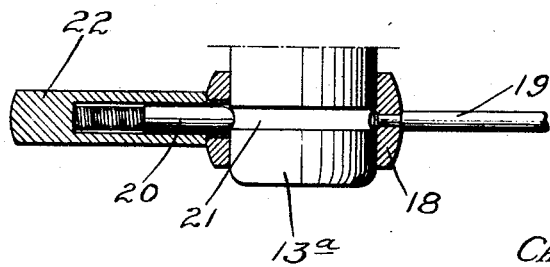
Fig. 5 is a section on line 5—5 of Fig. 1.

Referring now more particularly to the drawings, the numeral 10 generally designates a suitable base from which arise standards 11. These standards, which are relatively wide, at the approximate centers thereof have bearings 12 in which a shaft 13 is rotatably mounted. Between the standards, shaft 13 has secured thereto a cam 14 and a pendulum 15, the arm 16 of the pendulum having projecting to one side thereof a latch lug 17. One of the bearings 12 rigidly mounts a gudgeon 13—a coaxial with the shaft and forming a bearing for a collar 18. This collar carries a pointer 19 and has associated therewith a spring-pressed plunger 20 operating in a groove 21 formed in the gudgeon and serving both to prevent longitudinal displacement of the collar upon the gudgeon and to frictionally resist rotation of the collar and pointer. The plunger 20 is preferably mounted in a handle element 22 diametrically opposed to the pointer which serves both as a counter-balance for the pointer and as a means for rotatably shifting the same.

Secured to shaft 13 between the standards is a crank arm 23 having a projecting pin 24 arranged in the path of pointer 19. Mounted in standards 11 adjacent one side thereof is a rock shaft 25 mounting a latch nose 26 for engagement with the latch lug 17 of the pendulum arm. The latch lug is preferably disposed at one end of a lever 27 secured to the shaft 25, the opposite end of the lever co-acting with a stop 28, which is hereinafter more fully disclosed, provides a bearing for another portion of the apparatus.

The outer end of shaft 25 is provided with an operating handle 29 and has associated therewith a spring 30 constantly urging rotation of the shaft in a direction to engage the lever with stop 28 and so to position the latch nose for engagement with the lug of the pendulum arm.

Base 10 is provided with a pointer 31 which by correlation with index 32 carried by the pendulum may be employed to determine the proper leveling of the base.

Stop 28 is in the form of a transversely-extending shaft connecting the upper ends of standards 11 adjacent one side thereof, and there is a corresponding shaft 28—a connecting the standards at the opposite side thereof. Upon these shafts tilting tables 33 are pivoted through apertured ears 34. Each table 33 has at its inner end a depending roller bearing arm 35 the rollers 36 of which have their axes vertically aligned with the axis of shaft 13. The inner ends of these tables are counterweighted as at 37 in order to maintain rollers 36 in engagement with cam 14 with which they align. Upon the upper surfaces of each table is mounted a clamping lever 38 the inner end of which has pivotally connected thereto a clamping head 39 adapted to cooperate with the upper surface of the table to clamp a sheet thereto, and the outer end of which has directed therethrough an adjusting screw 40 engaging the upper surface of table 33 to urge the clamping head toward the table against the influence of a spring 41.

In use of the apparatus a pair of sheets "S" are clamped between the clamping heads 39 and the table, and adjacent edges of these sheets are connected by the gummed tape "T" which is to be tested. A short space of time is allowed to elapse to permit the glue to partially set, after which the time lever 29 is operated to release pendulum 15. Pendulum 15 as it swings downwardly rotates shaft 13 and through this shaft cam 14 and crank arm 23. Cam 14 acting upon rollers 36 urges adjacent edges of the tables 33 upwardly and accordingly increases the distance between adjacent edges of the sheets "S" applied thereto thereby applying a pull against the sheets "S" and upon the tape "T" which is being tested. At the same time rotation of the shaft is imparted to the pointer through pin 24 bringing this pointer into cooperative relation with a dial 42. It will be noted that the pendulum will act upon the tables with a constantly decreasing force so that the adhesive resistance will finally overcome the force applied by the pendulum thereby checking the movement thereof. Return movement of the pendulum withdraws the pin 24 from the pointer with the result that the pointer which is frictionally held against rotation will remain at the point of its furthest advance and retain a record thereof.

It will be obvious that apparatus of this character may be very simply operated and will provide an accurate and readily acquired test for determining the relative qualities of various gummed tapes. It will also be obvious that the construction employed is capable of considerable range of change and modification without departing from the spirit of my invention. I accordingly do not limit myself to such specific structure except as hereinafter claimed.

I claim:

1. In a testing machine of the character described, opposed normally aligned tables mounted for tilting movement, means for clamping to said tables members the adjacent edges of which are connected by a gummed tape, and means for oppositely tilting the tables to cause separation of said clamping means and thereby place a strain upon the adhesive connection between the tape and said members comprising a pendulum-operated cam and means on the tables at adjacent edges thereof operatively engaging said cam.

2. In a testing machine, opposed tables, means mounting said tables for pivotal movement about axes paralleling adjacent edges thereof, means for clamping to said tables the outer edges of members adjacent edges of which are adhesively connected by a gummed tape and means operatively co-acting with adjacent edges of said tables for oppositely tilting the tables to cause separation of said clamping means and thereby place a strain upon the adhesive connection.

3. In a testing machine, opposed tables, means mounting said tables for tilting movement about axes paralleling adjacent edges thereof, means for clamping to said tables members adjacent edges of which are adhesively connected by a gummed tape, cam means underlying adjacent edges of said tables, means on the tables operatively engaging the cam means to cause tilting of the tables in a direction separating the clamping means upon movement of said cam means, means for supplying a constantly decreasing force to rotate said cam means, and means for indicating the extent of rotation of the cam means.

4. In a testing machine, opposed standards, spaced pivots carried by the standards, opposed tables mounted upon the pivots at points spaced from adjacent edges thereof, clamping means on each table, a shaft mounted in the standards and underlying adjacent edges of the tables, a cam carried by the shaft, means on adjacent edges of the tables operatively engaging the cam to cause tilting of the tables in a direction separating the clamping means upon movement of said cam means, a pendulum secured to the shaft, and means for registering movement of the pendulum in one direction.

5. A device as claimed in claim 4 wherein the means on the tables operatively engaging the cam comprises rollers carried by adjacent edges of the tables.

6. In a testing machine, opposed tables mounted on pivots spaced from adjacent edges thereof, clamping means on each table, a pendulum shaft extending beneath adjacent edges of the tables, cam means operated by said pendulum shaft, means on adjacent edges of the tables operatively engaging the cam means whereby to case tilting of the tables in a direction separating the clamping means when the shaft is rotated in one direction, a pendulum secured to said shaft to rotate the shaft in said direction, and means for indicating the extent through which the pendulum moves.

7. A device as claimed in claim 6 wherein the cam means comprises a cam directly mounted on the pendulum shaft and the means on the tables comprises rollers directly engaging said cam.

CHARLES B. THWING.